(12) United States Patent
Kim

(10) Patent No.: US 10,697,863 B2
(45) Date of Patent: Jun. 30, 2020

(54) APPARATUS AND METHOD OF REMOVING WATER BY CHANGING PHASE OF WATER CONTAINED GASEOUS MATERIAL TO FROST PHASE

(71) Applicant: KONKUK UNIVERSITY INDUSTRIAL COOPERATION CORP, Seoul (KR)

(72) Inventor: Jo-chun Kim, Seoul (KR)

(73) Assignee: Konkuk University Industrial Cooperation Corp., Seoul (KR)

( * ) Notice: Subject to any disclaimer, the term of this patent is extended or adjusted under 35 U.S.C. 154(b) by 233 days.

(21) Appl. No.: 15/762,826

(22) PCT Filed: Mar. 14, 2016

(86) PCT No.: PCT/KR2016/002493
§ 371 (c)(1),
(2) Date: Mar. 23, 2018

(87) PCT Pub. No.: WO2017/052012
PCT Pub. Date: Mar. 30, 2017

(65) Prior Publication Data
US 2018/0231440 A1 Aug. 16, 2018

(30) Foreign Application Priority Data

Sep. 24, 2015 (KR) .......... 10-2015-0135104
Sep. 24, 2015 (KR) .......... 10-2015-0135107

(51) Int. Cl.
*F25D 17/06* (2006.01)
*C02F 1/04* (2006.01)
(Continued)

(52) U.S. Cl.
CPC ............. *G01N 1/22* (2013.01); *B01D 5/0042* (2013.01); *B01D 7/02* (2013.01); *B01D 53/265* (2013.01);
(Continued)

(58) Field of Classification Search
CPC ................. C02F 1/048; F25D 17/06
(Continued)

(56) References Cited

U.S. PATENT DOCUMENTS 7,305,838 B2 * 12/2007 Fornof .................. F04B 39/06
62/291
2004/0025526 A1 2/2004 Aflekt et al.
2004/0194478 A1 10/2004 Maeda et al.

FOREIGN PATENT DOCUMENTS

KR      10-0827484 B1   5/2008
KR      10-0916521 B1   9/2009
KR      10-1158676 B1   6/2012

OTHER PUBLICATIONS

International Search Report issued in connection with PCT/KR2017/003095.

* cited by examiner

Primary Examiner — Robert A Hopkins
(74) Attorney, Agent, or Firm — Akerman LLP

(57) ABSTRACT

The present invention relates to an apparatus and a method of removing water contained in a gaseous material. An apparatus of removing water by phase-changing water contained in a gaseous material to a frost phase includes a gas inflow unit 100, a main body 200, a discharging unit 300, and a frost discharging unit 400. A method of removing water by phase-changing water contained in a gaseous material to a frost phase includes phase-changing water contained in gas to a frost phase, separating the phase-changed frost and the gas from which water is removed,
(Continued)

discharging the gas from which the water is removed to the outside, and discharging the phase-changed frost to the outside.

13 Claims, 8 Drawing Sheets

(51) Int. Cl.
    *G01N 1/22*         (2006.01)
    *B01D 53/26*      (2006.01)
    *B01D 7/02*        (2006.01)
    *B01D 5/00*        (2006.01)
    *B03C 3/16*        (2006.01)

(52) U.S. Cl.
    CPC ................ *B03C 3/16* (2013.01); *C02F 1/048* (2013.01); *F25D 17/06* (2013.01); *G01N 1/2273* (2013.01); *B01D 2257/302* (2013.01); *B01D 2257/404* (2013.01); *B01D 2257/502* (2013.01); *B01D 2257/504* (2013.01); *B01D 2257/60* (2013.01); *B01D 2257/708* (2013.01); *B01D 2257/80* (2013.01); *B01D 2257/90* (2013.01); *B01D 2258/06* (2013.01); *G01N 2001/2282* (2013.01)

(58) Field of Classification Search
    USPC ......................................... 55/DIG. 15; 62/93
    See application file for complete search history.

APPARATUS AND METHOD OF REMOVING WATER BY CHANGING PHASE OF WATER CONTAINED GASEOUS MATERIAL TO FROST PHASE

This application is a national phase of PCT/KR2016/002493, filed Mar. 14, 2016, and claims priority to KR 10-2015-0135104, filed Sep. 24, 2015, and KR 10-2015-0135107, filed Sep. 24, 2015, the entire contents of all of which are hereby incorporated by reference.

TECHNICAL FIELD

The present invention relates to an apparatus and a method of removing water contained in a gaseous material, and more particularly, to an apparatus and a method of removing water by cooling a gaseous material containing water to phase-change the water to a frost phase and separate the water so that a target gas in which water is not contained is obtained.

BACKGROUND ART

Our natural environment is becoming devastated more and more due to urbanization, population increase, and indiscriminate nature destruction. In particular, it is no exaggeration to say that the environmental pollution which is emerged along with rapid industrial development is not limited to some countries, but all countries in the world are facing a situation that they have to seriously contemplate and respond to the environmental pollution.

A countermeasure against the environmental pollution problem may be broadly classified into a technology of suppressing emission of pollutants and a technology of removing emitted pollutants which are inevitably emitted.

Between the technologies, in order to suppress emission of the pollutants, allowable emission standards for every emission source are established, managed, and regulated. Generally, monitoring is performed to identify an emission amount or an emission concentration of pollutants and the monitoring of emission takes a very important part in the field of environmental pollution control.

In particular, an apparatus of monitoring air pollutants caused from combustion of fossil fuel or various manufacturing processes in the environmental pollution generally uses a measurement method based on an optical device. However, in some cases, it is difficult for the monitoring apparatus to identify an exact name or concentration of the air pollutants contained in combusted gas due to moisture or particulate materials contained in a gaseous material to be measured.

Therefore, in order to exactly identify the pollutants and the concentration thoseof, the pollutants need to be introduced into the measurement device after removing moisture or particulate materials which obstruct measurement or analysis in advance and thus a filter may be used as such a pre-treatment method. There may be a problem in that the filter removes not only the moisture and particulate materials, but also gaseous pollutants which need to be measured so that they should not be removed because the moisture or particulate materials which are removed through the filter form another filter media. Therefore, it is difficult to exactly identify the pollutants.

As the related art for solving the above-mentioned problem, Korean Unexamined Patent Application Publication No 2006-0039465 discloses a pretreatment apparatus of removing moisture which includes a glass tube and a Peltier trap for cooling and adhering moisture onto an inner periphery to remove the moisture, and a moisture pretreatment unit for analyzing air pollution which is heated and driven to remove moisture after completely collecting samples by a sampling unit.

According to the related art, moisture contained in the gas may be removed using the Peltier trap. However, the moisture contained in the contaminated gas is condensed on an inner periphery of a tube so that a diameter of a flow passage becomes narrower. Therefore, it is difficult to constantly maintain a flow rate of the gas flowing into the measurement device.

That is, according to the method of the related art which uses a Peltier trap, as an amount of moisture flowing into the Peltier trap is increased, the diameter of the flow passage rapidly becomes narrower and finally, the tube is clogged before regenerating the tube, thereby basically causing loss of the target material. Therefore, the number of tubes needs to be increased to prevent such a clogging phenomenon and correspondingly the number of flow rate adjusting devices and Peltier traps needs to be increased, which causes a great economic loss.

DISCLOSURE

Technical Problem

A first object to be achieved by the present invention is to provide an apparatus and a method of removing water by phase-changing water contained in a gaseous material to a frost phase which completely removes the water contained in the gaseous material which obstructs measurement or analysis, thereby ensuring reliability for a monitoring device of an air pollutant.

A second object of the present invention is to provide an apparatus and a method of removing water contained in a gaseous material which has a simple configuration, thereby easily performing the maintenance of the device and constantly maintaining a flow rate of gas.

Technical Solution

According to an aspect of the present invention, an apparatus of removing water by phase-changing water contained in a gaseous material to a frost phase includes: a gas inflow unit 100 which is equipped with a first cooling unit 102 which phase-changes the water in inflow gas which includes water at one side; a main body 200 which collects the frost generated in the gas inflow unit 100 and provides a space for moving the gas from which moisture is removed; a discharging unit 300 which discharges the gas from which the moisture is removed and is connected to one side of the main body 200; and a frost discharging unit 400 which communicates with the main body 200 to discharge frost collected in the space.

In the apparatus according to the present invention, the gas inflow unit 100 may further include a heating unit 101 equipped with a heating member for adjusting gas which contains water to 60° C. to 150° C.

In the apparatus according to the present invention, the first cooling unit 102 may adjust the gas which passes through the heating unit 101 to be −10° C. or lower.

In the apparatus according to the present invention, the gas inflow unit 100 may further include a pulsed air supply unit which discharges the collected frost to the frost discharging unit 400.

The apparatus according to the present invention may further include any one or more shut-off valves of a first shut-off valve 301 equipped in the discharging unit 300 which controls the discharge of the gas from which the water is removed and a second shut-off valve 401 equipped hi the frost discharging unit 400 which discharges the collected frost 220 to the outside.

The apparatus according to the present invention may further include a second cooling unit 240 which cools the main body 200 so as not to dissolve the frost 220 collected in the main body 200 provided at one side of the main body 200.

In the apparatus according to the present invention, the first cooling unit 102 may be silica or glass.

In the apparatus according to the present invention, the main body 200 may further include a collecting unit 230 having a concave shape at a lower portion to collect the phase-changed frost.

In the apparatus according to the present invention, a tapered portion 103 in which an inner diameter at one side of the first cooling unit 102 connected to the main body 200 is gradually reduced may be formed.

According to another aspect of the present invention, a method of removing water by phase-changing water contained in a gaseous material to a frost phase includes a first step S110 of phase-changing water contained in a gas to a frost phase by cooling inflow gas which contains water; a second step S120 of separating the phase-changed frost and the gas from which water is removed; a third step S130 of discharging the gas from which water is removed to the outside; and a fourth step S140 of discharging the phase-changed frost to the outside.

The method according to the present invention may further include, before the first step S110, a step of adjusting the gas which contains water to 60° C. to 150° C.

In the method according to the present invention, the cooling temperature in the first step S110 may be adjusted to be −10° C. or lower.

In the method according to the present invention, in the fourth step S140, the frost phase-changed by pulsed air supply may be discharged to the outside.

According to another aspect of the present invention, a method of removing water by phase-changing water contained in a gaseous material to a frost phase includes a step of cooling a gaseous material which contains water, in which water contained in the gaseous material is phase-changed to a frost by the cooling step to be separated from the gaseous material.

The method may further include, before the cooling step, a step of heating the gaseous material containing water, a heating temperature in the heating step may be adjusted to 60° C. to 150° C. and a cooling temperature in the cooling step may be adjusted to −10° C. or lower.

Further, preferably, a heating temperature in the heating step may be adjusted to 60° C. to 100° C. and a cooling temperature in the cooling step may be adjusted to −20° C. to −50° C.

Furthermore, a specific gravity of the frost may be in the range of 0.11 to 0.24 g/cm$^3$ and the gaseous material may further include any one or more pollutants selected from ultrafine dust, nitrogen oxide, sulfur oxide, greenhouse gases, carbon monoxide, odor materials, heavy metals, and volatile organic compounds.

Advantageous Effects

According to the apparatus and the method of removing water by phase-changing water contained in a gaseous material to a frost phase of the present invention, the water contained in the gaseous pollutant may be completely removed only by simple manipulation of adjusting a temperature of gas containing a pollutant to be measured and water within a predetermined range.

A phase of the water which is removed by the apparatus and the method of the present invention is changed to frost which forms a large space between condensed moisture particles and has a very low density so that not only blockage of a tube through which gas moves is remarkably reduced, but also frost is easily discharged to the outside only by simply supplying air.

DESCRIPTION OF DRAWINGS

Drawings are provided for more understanding of a technical spirit of the present invention together with the detailed description so that the present invention should not be construed as being limited to the matters illustrated in the drawings:

FIGS. 11A & 11B are side views of a removing apparatus illustrated in FIG. 10, in which FIG. 11A is a side view of a gas discharging mode and FIG. 11B is a side view of a frost discharging mode.

DESCRIPTION OF MAIN REFERENCE NUMERAL OF DRAWINGS

Figure 1:
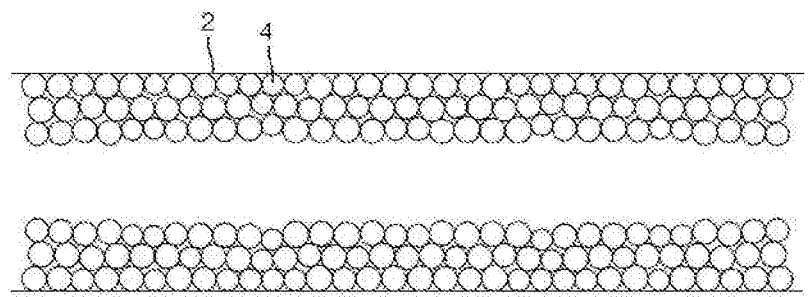
FIG. 1 is a side cross-sectional view illustrating a growth schematic view of a typical water condensed particle 4 in a gas movement pipe 2.

2: Gas movement pipe
4: Water condensed particle
6: Frost condensed particle
10: Inflow guide pipe
11: Heating unit
20: Main body pipe
21: Cooling unit
30: Water-contained gas
32: Frost
34: Dried gas
100: Pollutant-contained gas inflow unit
101: Heating unit
102: First cooling unit
103: Tapered portion 200: Main body
220: Collected frost
230: Collecting unit
240: Second cooling unit
300: Discharging unit
301: First shut-off valve
400: Frost discharging unit
401: Second shut-off valve

BEST MODE

Hereinafter, a configuration of the present invention will be described in more detail with reference to the accompanying drawings. Those skilled in the art may make various modifications to the present invention and the present invention may have various embodiments thereof, and thus specific embodiments will be illustrated in the drawings and described in detail in detailed description.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance.

If it is not contrarily defined, all terms used herein including technological or scientific terms have the same meaning as those generally understood by a person with ordinary skill in the art. Terms which are defined in a generally used dictionary should be interpreted to have the same meaning as the meaning in the context of the related art but are not interpreted as an ideally or excessively formal meaning if it is not clearly defined in the present invention.

The present invention relates to an apparatus of removing water by phase-changing water contained a gaseous material to a frost phase. "Water" described throughout the specification includes not only water in a liquid state, but also water in a gas state and "frost" means a state in which water ($H_2O$) contained in the gas is finely condensed and the finely condensed particles are very loosely bonded.

Figure 3:
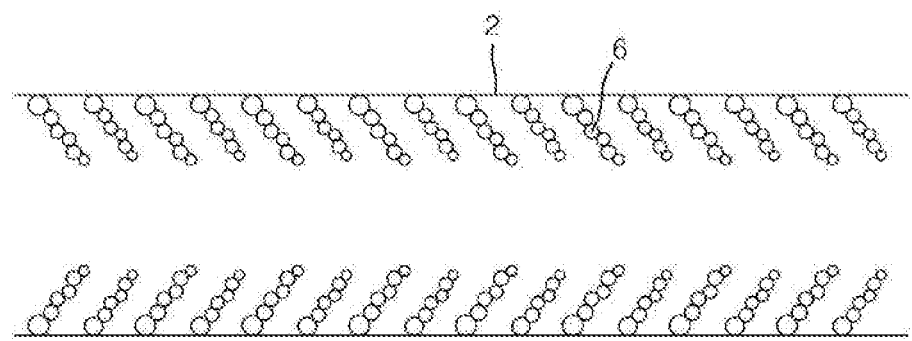
FIG. 3 is a side cross-sectional view illustrating a growth schematic view of a frost condensed particle 6 according to an exemplary embodiment of the present invention in a gas movement pipe 2.
Figure 4:
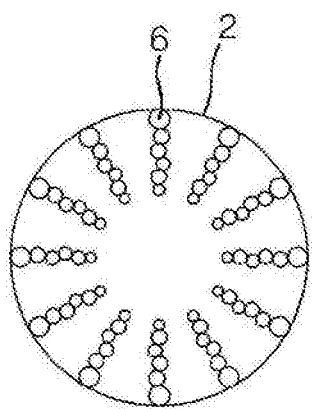
FIG. 4 is a longitudinal sectional view of FIG. 3.

Difference between a generally known water condensed particle and the frost of the present invention will be described in detail with reference to FIGS. 1 to 3. FIG. 1 is a side cross-sectional view illustrating a growth schematic view of a typical water condensed particle 4 in a gas movement pipe 2, FIG. 2 is a longitudinal sectional view of FIG. 1, and FIG. 3 is a side cross-sectional view illustrating a growth schematic view of a frost condensed particle 6 according to an exemplary embodiment of the present invention in a gas movement pipe 2, and FIG. 4 is a longitudinal sectional view of FIG. 3.

Figure 2:
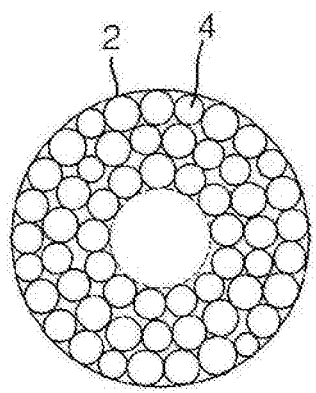
FIG. 2 is a longitudinal sectional view of FIG. 1.

As illustrated in FIGS. 1 and 2, in typical condensed particles formed by cooling, new condensed particles are bonded around surfaces of condensed particles. When the condensed particles consistently flow therein, condensed particles located in a lump of condensed particles are grown to a big lump of ices and obstruct the flow of gas. However, as illustrated in FIGS. 3 and 4, in the present invention, the frost has a very small number of contact surfaces which interconnect the micro condensed particles to each other, but the frost has many free surfaces which are not in contact. Therefore, even though the micro condensed particles consistently flow therein, the micro condensed particles are mostly grown in one direction so that it does not significantly obstruct the flow of the gas.

Figure 5:
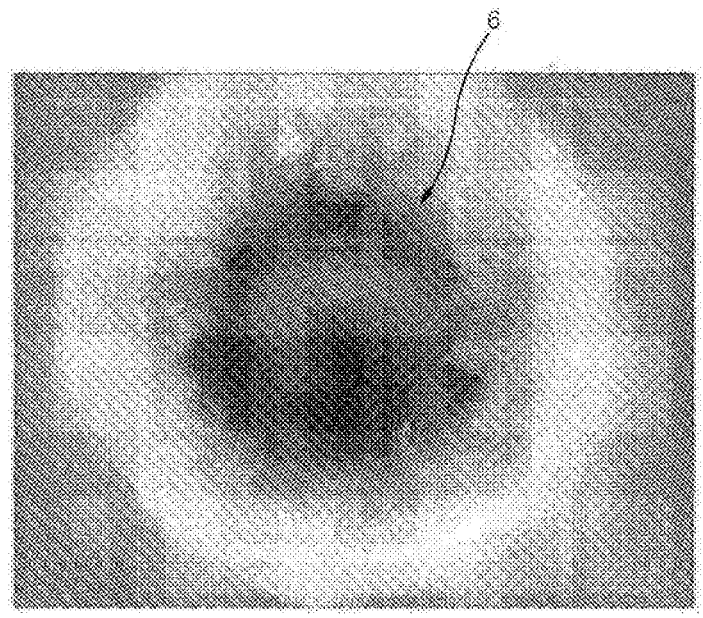
FIGS. 5 and 6 are photographs obtained by photographing a frost of the present invention generated in a gas movement pipe 2 of FIGS. 3 and 4.
Figure 6:
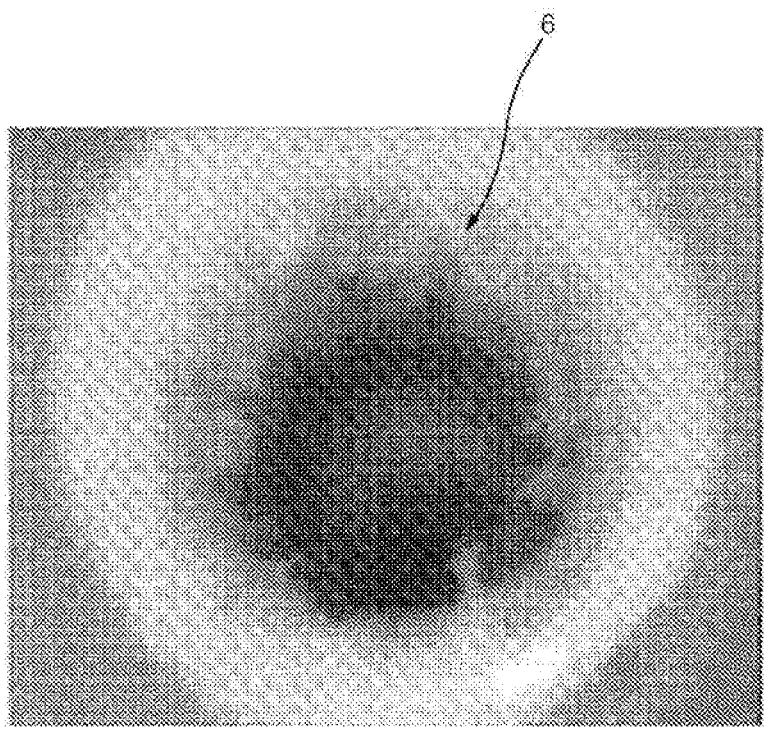

The frost may be identified from FIGS. 5 and 6 which are actual photographs generated in the gas movement pipe. That is, the condensed particles are loosely bonded to each other so that even though the frost is grown to be large, the bonding is easily broken by a physical impact from the outside, for example, a flow of inflowing gas.

The principle of removing water by phase-changing the water contained in the gas to frost is based on the Mpemba effect. The Mpemba effect means a phenomenon in which hot water may freeze faster than cold water under the same cooling condition. When water molecules are bonded to be close to each other, the water molecules are attracted to each other due to a hydrogen bond and a covalent bond between hydrogen and oxygen atom is lengthened to accumulate energy. When such water is boiled, the hydrogen bond is lengthened and a density of water is reduced. In this case, the covalent bond is shortened again to emit the accumulated energy. That is, since hot water in which a lot of energy is accumulated more quickly emits energy at the time of cooling, the hot water freezes quickly.

A density which is a physical property of frost of the present invention will be described in detail.

Example 1

Figure 7:
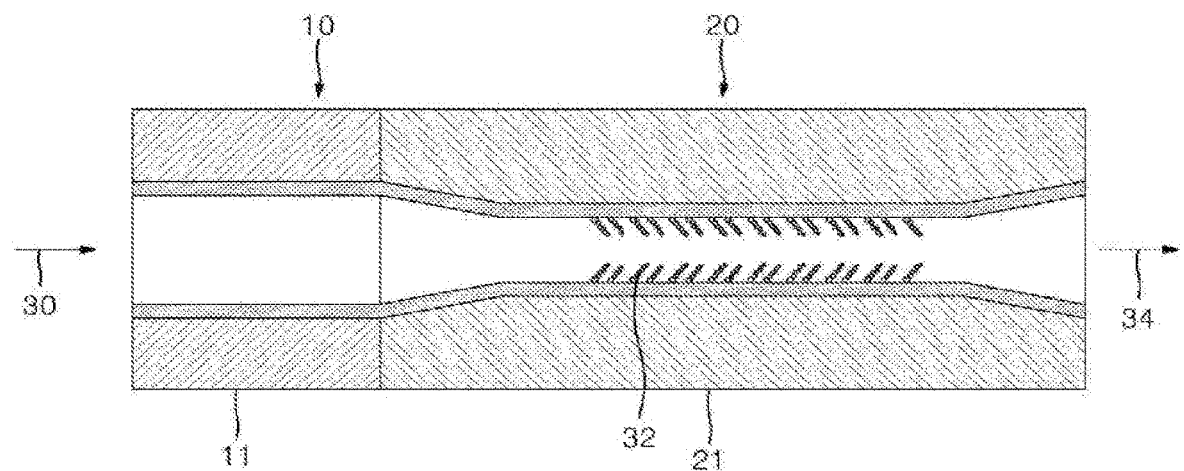
FIG. 7 is a schematic cross-sectional view of an apparatus used to measure a density of a phase-changed frost.

FIG. 7 is a schematic cross-sectional view of an apparatus used to measure a density of a phase-changed frost. In order to measure a density of frost, a temperature of the gas 30 which contains water is adjusted to be 60° C. by a heating unit 11 while the gas 30 flows into the inflow guide pipe 10 using the apparatus illustrated in FIG. 7. Next, the gas which is adjusted within the above-mentioned temperature range is transferred to a main body 20 which is maintained at −20° C. by a cooling unit 21 to change the phase of water contained in the gas to the frost 32. In this case, the density is calculated from a volume of the main body pipe 20 and a weight of frost at the saturation point of the phase-changed frost, that is, at the time when all spaces of the main body pipe 20 are filled with the frost 32.

Figure 8:
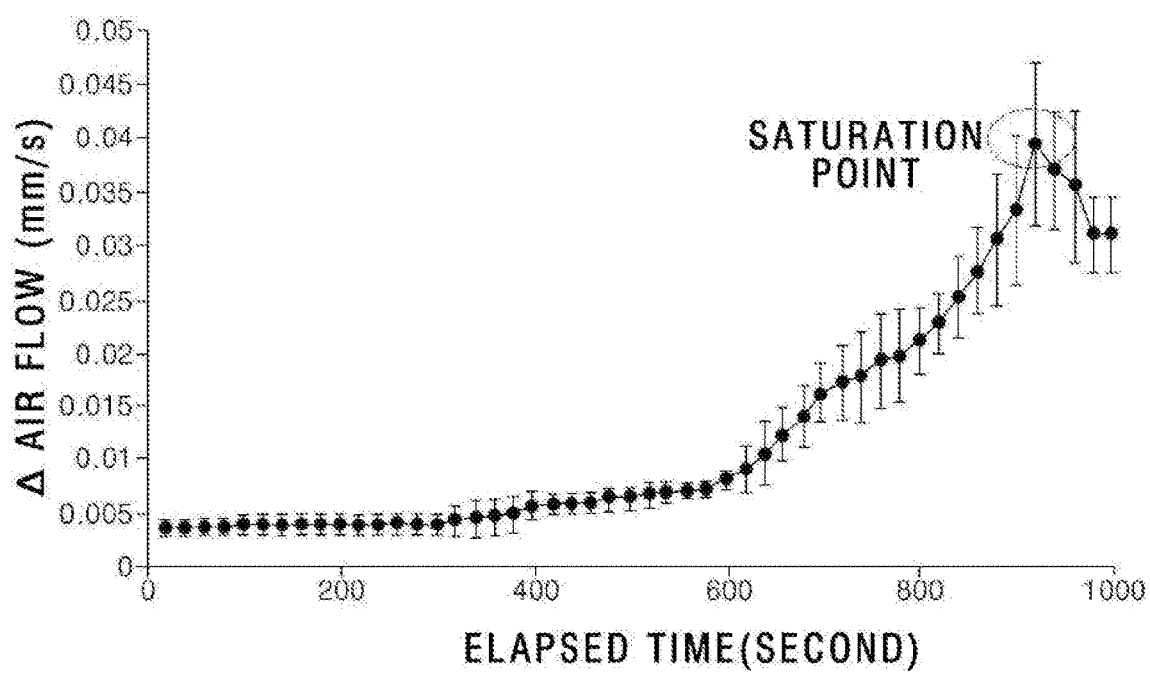
FIG. 8 is a graph illustrating a saturation point of a phase-changed frost.

FIG. 8 is a graph illustrating a saturation point of a phase-changed frost. As illustrated in FIG. 8, the saturation point of the phase-changed frost means a time when a difference ($\Delta V = V1 - V2$) between a gas flow rate V1 at an outlet of the inflow guide pipe 10 and a gas flow rate V2 at an outlet of the main body pipe 20 is rapidly changed. That is, water contained in the gas is phase-changed to generate frost and the inner diameter of the main body pipe 20 is gradually reduced due to the frost. Therefore, the flow rate V1 at the outlet of the inflow guide pipe 10 is constant but the flow rate V2 at the outlet of the main body pipe 20 is gradually increased. Further, when the spaces of the main body pipe 20 are fully filled with the generated frost 32, some of frost which is weakly bonded to each other is discharged to the outlet of the main body pipe 20 by the flow rate V1 at the outlet of the inflow guide pipe 10 so that the flow rate V2 at the outlet is decreased. As a result, $\Delta V$ is reduced.

As described above, the density of the frost of the present invention measured at the time when the frost which is phase-changed by heating and then cooling the gas reaches the saturation point is represented in Table 1.

TABLE 1

Density of frost (inflow temperature: 60° C., cooling temperature: −20° C.)

| | Volume (mL) | Weight of frost (g) | Density (g/mL) |
|---|---|---|---|
| 1 | 0.558 | 0.124 | 0.21 |
| 2 | 0.572 | 0.128 | 0.22 |
| 3 | 0.551 | 0.127 | 0.23 |
| 4 | 0.568 | 0.131 | 0.24 |
| 5 | 0.565 | 0.125 | 0.22 |
| 6 | 0.564 | 0.128 | 0.23 |
| 7 | 0.567 | 0.126 | 0.22 |
| | Average | | 0.23 |

Example 2

Example 2 is the same as Example 1 except that an inflow temperature of a gas which contains water is adjusted to 60° C. and then the gas which is adjusted to the above temperature range is transferred to the main body pipe 20 which is maintained at −30° C.

TABLE 2

Density of frost (inflow temperature: 60° C., cooling temperature: −30° C.)

| | Volume (mL) | Weight of frost (g) | Density (g/mL) |
|---|---|---|---|
| 1 | 0.976 | 0.169 | 0.174 |
| 2 | 0.978 | 0.168 | 0.172 |
| 3 | 0.979 | 0.165 | 0.169 |
| 4 | 0.975 | 0.170 | 0.175 |
| 5 | 0.969 | 0.177 | 0.183 |
| | Average | | 0.174 |

Example 3

Example 3 is the same as Example 1 except that an inflow temperature of a gas which contains water is adjusted to 60° C. and then the gas which is adjusted to the above temperature range is transferred to the main body pipe 20 which is maintained at −40° C.

TABLE 3

Density of frost (inflow temperature: 60° C., cooling temperature: −40° C.)

| | Volume (mL) | Weight of frost (g) | Density (g/mL) |
|---|---|---|---|
| 1 | 1.043 | 0.159 | 0.153 |
| 2 | 1.043 | 0.161 | 0.154 |
| 3 | 1.052 | 0.159 | 0.151 |
| 4 | 1.045 | 0.168 | 0.161 |
| 5 | 1.037 | 0.169 | 0.163 |
| | Average | | 0.157 |

Example 4

Example 4 is the same as Example 1 except that an inflow temperature of a gas which contains water is adjusted to 60° C. and then the gas which is adjusted to the above temperature range is transferred to the main body pipe 20 which is maintained at −50° C.

TABLE 4

Density of frost (inflow temperature: 60° C., cooling temperature: −50° C.)

| | Volume (mL) | Weight of frost (g) | Density (g/mL) |
|---|---|---|---|
| 1 | 1.182 | 0.155 | 0.131 |
| 2 | 1.167 | 0.140 | 0.120 |
| 3 | 1.156 | 0.143 | 0.123 |
| 4 | 1.172 | 0.149 | 0.127 |
| 5 | 1.178 | 0.150 | 0.128 |
| | Average | | 0.126 |

Example 5

Example 5 is the same as Example 1 except that an inflow temperature of a gas which contains water is adjusted to 100° C. and then the gas which is adjusted to the above temperature range is transferred to the main body pipe 20 which is maintained at −20° C.

TABLE 5

Density of frost (inflow temperature: 100° C., cooling temperature: −20° C.)

| | Volume (mL) | Weight of frost (g) | Density (g/mL) |
|---|---|---|---|
| 1 | 0.579 | 0.118 | 0.203 |
| 2 | 0.580 | 0.125 | 0.215 |
| 3 | 0.585 | 0.117 | 0.200 |
| 4 | 0.579 | 0.126 | 0.218 |
| 5 | 0.583 | 0.117 | 0.201 |
| | Average | | 0.207 |

Example 6

Example 6 is the same as Example 1 except that an inflow temperature of a gas which contains water is adjusted to 100° C. and then the gas which is adjusted to the above temperature range is transferred to the main body pipe 20 which is maintained at −30° C.

TABLE 6

Density of frost (inflow temperature: 100° C., cooling temperature: −30° C.)

| | Volume (mL) | Weight of frost (g) | Density (g/mL) |
|---|---|---|---|
| 1 | 0.961 | 0.163 | 0.169 |
| 2 | 0.959 | 0.165 | 0.172 |
| 3 | 0.970 | 0.158 | 0.163 |
| 4 | 0.967 | 0.160 | 0.165 |
| 5 | 0.956 | 0.178 | 0.186 |
| | Average | | 0.171 |

Example 7

Example 7 is the same as Example 1 except that an inflow temperature of a gas which contains water is adjusted to 100° C. and then the gas which is adjusted to the above temperature range is transferred to the main body pipe 20 which is maintained at −40° C.

TABLE 7

Density of frost (inflow temperature: 100°
C., cooling temperature: −40° C.)

| | Volume (mL) | Weight of frost (g) | Density (g/mL) |
|---|---|---|---|
| 1 | 1.026 | 0.129 | 0.125 |
| 2 | 1.058 | 0.127 | 0.120 |
| 3 | 1.064 | 0.128 | 0.120 |
| 4 | 1.072 | 0.129 | 0.121 |
| 5 | 1.061 | 0.147 | 0.138 |
| | Average | | 0.125 |

Example 8

Example 7 is the same as Example 1 except that an inflow temperature of a gas which contains water is adjusted to 100° C. and then the gas which is adjusted to the above temperature range is transferred to the main body pipe 20 which is maintained at −50° C.

TABLE 8

Density of frost (inflow temperature: 100°
C., cooling temperature: −50° C.)

| | Volume (mL) | Weight of frost (g) | Density (g/mL) |
|---|---|---|---|
| 1 | 1.107 | 0.135 | 0.122 |
| 2 | 1.112 | 0.124 | 0.111 |
| 3 | 1.104 | 0.121 | 0.110 |
| 4 | 1.099 | 0.137 | 0.124 |
| 5 | 1.124 | 0.130 | 0.116 |
| | Average | | 0.117 |

As generally known, a density of water is approximately 1 g/mL, and a density of ice is approximately 0.92 g/mL, but a density of frost of the present invention is 0.11 to 0.24 g/mL which is approximately 1/10 to 1/5 of water or ice. That is, the frost generated by the water removing method of the present invention forms a space between crystal particles so that the density thereof is very low. Further, the space serves as a passage through which gas passes so that blockage of the channel may be minimized.

Figure 9:
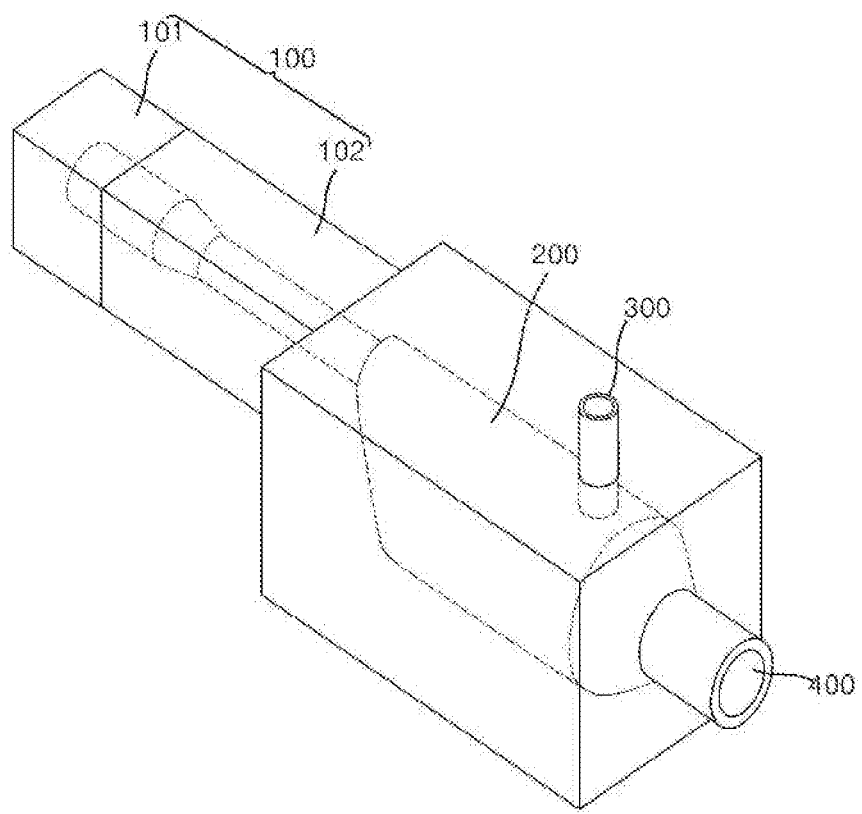
FIG. 9 is a perspective view of an apparatus of removing water contained in a gaseous material according to an exemplary embodiment of the present invention.
Figure 10:
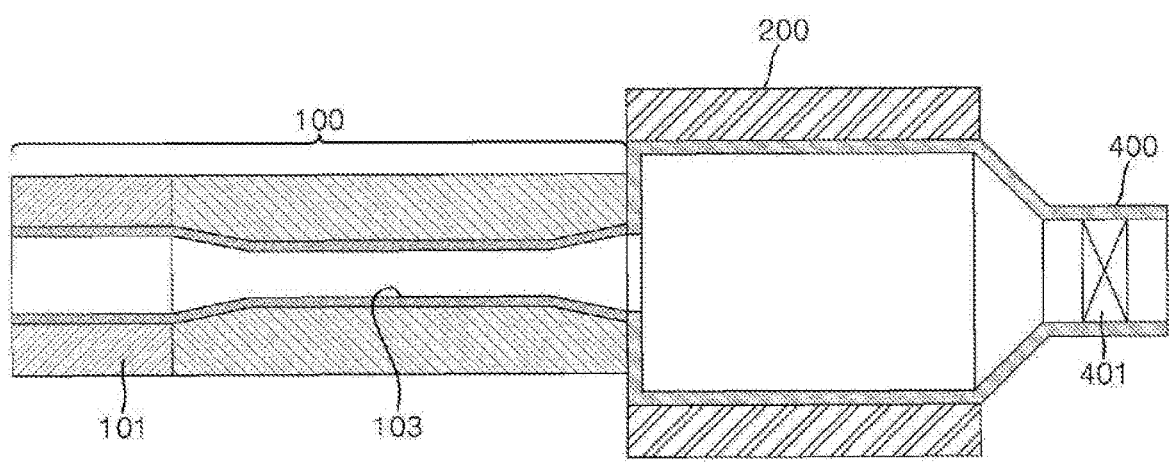
FIG. 10 is a plan view of an apparatus of removing water contained in a gaseous material according to an exemplary embodiment of the present invention.
Figure 11A:
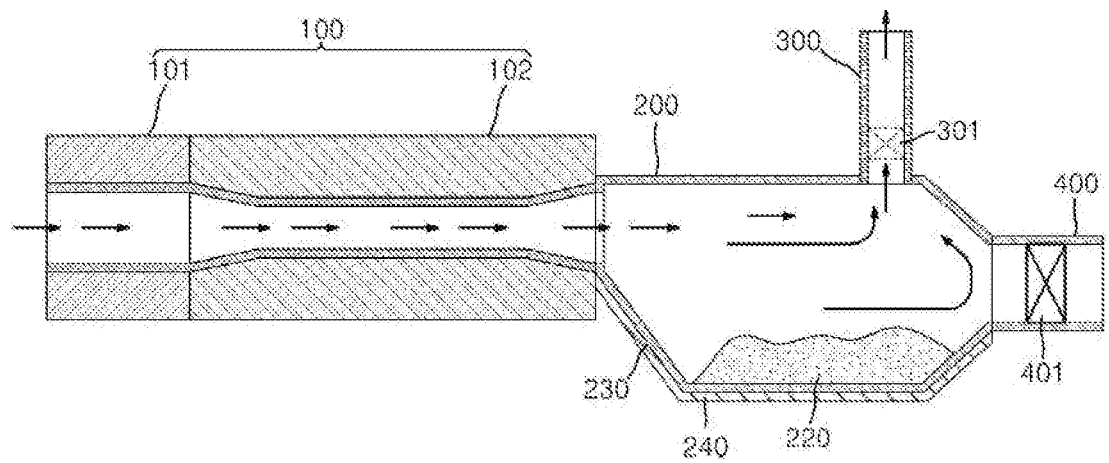
Figure 11B:
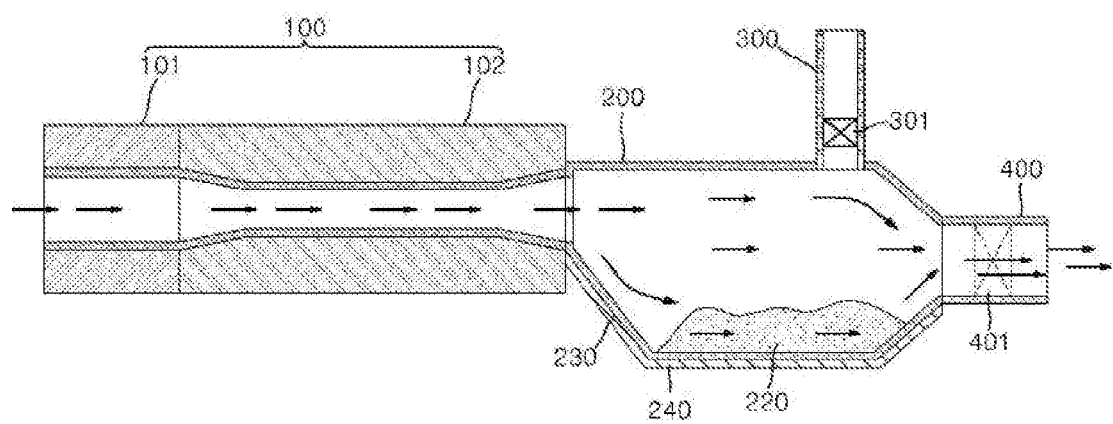

Hereinafter, an apparatus of removing water contained in the gas by phase-changing the water to frost will be described in detail. FIG. 9 is a perspective view of an apparatus of removing water contained in a gaseous material according to an exemplary embodiment of the present invention, FIG. 10 is a plan view of an apparatus of removing water contained in a gaseous material according to an exemplary embodiment of the present invention, and FIGS. 11A & 11B are side views of a removing apparatus illustrated in FIG. 10, in which FIG. 11A is a side view of a gas discharging mode and FIG. 11B is a side view of a frost discharging mode.

As illustrated in FIGS. 9 to 11B, the apparatus of removing water contained in the gaseous material by phase-changing the water to a frost phase of the present invention includes a pollutant-contained gas inflow unit 100, a main body 200, a discharging unit 300, and a frost discharging unit 400.

The individual components will be described in more detail. First, the pollutant-contained gas inflow unit 100 includes a hollow portion into which gas containing a pollutant to be measured and water flows, a heating unit 101, and a first cooling unit 102 provided at a rear end of the heating unit 101. When the frost 220 collected in the main body 200 which will be described below is to be discharged to the outside, the gas inflow unit 100 may also serve as a passage of air which is injected into the main body 200.

The pollutant-contained gas inflow unit 100 is provided to phase-change the water contained in a gaseous pollutant to be measured into the frost. The heating unit 101 heats the inflow gas and the first cooling unit 102 provided at a rear end of the heating unit 101 cools the gas which passes through the heating unit 101.

Here, the heating unit 101 is equipped with a heater (not illustrated) to heat the inflow gas and the first cooling unit 102 is configured to cool the heated gas so that the inflow gas is heated or cooled to a temperature in a predetermined range.

The first cooling unit 102 and the heating unit 101 are not specifically limited as long as they achieve the same function and the same effect. However, the first cooling unit 102 and the heating unit 101 are desirably a cooling Peltier, a heating Peltier, or a heater which exactly maintains a predetermined temperature.

The cooling Peltier and the heating Peltier which use the Peltier effect are devices which cool or heat a specific local portion. When DC electricity flows in a circuit after bonding both ends of two different metal lines, one bonded portion absorbs heat and the other bonded portion emits heat and when the direction of current is reversed, endothermic and exothermic phenomena are reversed, which is a sort of heat pumping phenomenon and a principle of electronic refrigeration. Therefore, the cooling Peltier and heating Peltier using the above-mentioned principle have an advantage in that a temperature of a specific position is accurately maintained to a desired temperature.

As described above, the reason why the gas inflow unit 100 is equipped with the heating unit 101 and the first cooling unit 102 is to phase-change water contained in the gaseous pollutant to frost using Mpemba effect as described above, which is one of major features of the present invention.

As an example, the gas which flows into the heating unit 101 is desirably adjusted to be 60° C. to 130° C., and more desirably, 60° C. to 100° C., using the heating Peltier. Further, the gas which flows into the cooling unit 102 is adjusted to be −10° C. or lower, and more desirably, −20° C. to −50° C., using the cooling Peltier.

If the temperature is out of a heating temperature range or a cooling temperature range, water contained in the gas is not crystallized or the particles of the crystallized water are too large so that the water is not phase-changed to a desired frost. Therefore, it is desirable to maintain the heating temperature and the cooling temperature within the above-described range. It is obvious that when the temperature of the inflow gas falls within the heating temperature range, a separate heating step is omitted and the gas may be immediately cooled.

As described above, the water contained in the gaseous pollutant flowing into the gas inflow unit 100 is phase-changed to a frost phase due to the Mpemba effect by the heating and/or the cooling so that the water is removed.

In the meantime, when particulate materials are included in the gaseous pollutant, the particulate materials are trapped in the water during the phase-changing to the frost or impinged on the phase-changed frost to be separated and removed from the gaseous flow.

Even though the heating unit 101 and the first cooling unit 102 are not specifically limited as long as they have a space to allow the gas to flow in and out, desirably, the heating unit 101 and the first cooling unit 102 may have a cylindrical shape having a space.

Further, a diameter of the first cooling unit 102 may vary according to an amount of inflow gas and a content of water contained in the gas. That is, in FIGS. 9 to 11, it is illustrated that a diameter of one side of the first cooling unit 102 connected to the main body 200 is gradually increased. However, to the contrary, the diameter of the first cooling unit 102 at a gas outlet side may be changed to form a tapered shape which is gradually reduced.

In the meantime, when a material of the first cooling unit 102 has a high thermal conductivity, heat exchange with ambient atmosphere is easily performed, so that it may be difficult to maintain −10° C. or lower. Therefore, desirably, the first cooling unit 102 may be formed of a material having a low thermal conductivity, such as silica or glass.

The main body 200 communicates with the pollutant-contained gas inflow unit 100, the discharging unit 300 which discharges the gaseous pollutant from which water is removed, and the frost discharging unit 400 which discharges frost 220 collected in the main body 200 to the outside.

The main body 200 may further include a second cooling unit 240 which encloses an outer periphery of the main body 200. The main body 200 forms a collecting unit 230 having a concave shape at a lower portion. The main body 200 performs a function of transferring the gaseous pollutant from which water is removed from the pollutant-contained gas inflow unit 100 to an analyzing device and the collecting unit 230 performs a function of collecting the frost which is generated by being phase-changed in the pollutant-contained gas inflow unit 100.

That is, the frost which is generated in the pollutant-contained gas inflow unit 100 to be inserted is precipitated by its own weight to be collected by the collecting unit 230 and the gaseous pollutant from which water is removed moves along an upper surface of the main body 200 to flow into the analyzing device.

The second cooling unit 240 provided at the outer periphery of the main body 200 performs a function of maintaining the temperature of the main body 200 at −1° C. to −5° C. so that the frost 220 collected in the main body 200 is not re-dissolved or phase-changed. The second cooling unit 240 may use the same cooling Peltier as the first cooling unit 102.

The discharging unit 300 is provided at a rear end of the main body 200 as described above and performs a function of guiding the gaseous pollutant from which the water is removed to the analyzing device. A first shut-off valve 301 may be further included in the discharging unit 300. The first shut-off valve 301 is provided to close the discharging unit 300 when the frost 220 collected in the main body 200 is discharged to the outside so that the frost does not flow into the analyzing device.

Here, the discharging unit 300 is not specifically limited as long as the discharging unit has a space which allows the gas to be inserted and discharged, but desirably has a cylindrical shape having a space and a material therefor has corrosion resistance and impact resistance.

In the main body 200, the water contained in the inflow gas is phase-changed to the frost and collected therein. When the collected frost 220 is excessively accumulated, there may be problems in that the frost may block the space of the main body 200 or the collected frost 220 may flow into the analyzing device through the discharging unit 300.

Therefore, as another one of major features of the present invention, a pretreatment device of the present invention further includes a frost discharging unit 400 to intermittently discharge the frost 220 collected in the collecting unit 230. Due to this configuration, the blockage of the main body 200 is avoided and the gaseous pollutant from which the water is removed may smoothly move to the discharging unit 300 along the upper surface of the main body 200.

To be more specific, when a predetermined amount of frost is collected in the collecting unit 230, air is supplied through a air supply unit (not illustrated) which communicates with the gas inflow unit 100 through the shut-off valve and the supplied air discharges the frost collected in the collecting unit 230 to the frost discharging unit 400 (see FIG. 11B).

Here, means which supplies the air is not specifically limited. Desirably, the air supplying means may supply the compressed air to the main body 200 intermittently, that is, in a pulsed manner and transfer the frost which is collected in the main body 200 by instant air supply to the frost discharging unit 400. Alternatively, air may be intermittently supplied to the outside of the main body using a vacuum means in a pulsed manner.

In the meantime, the frost discharging unit 400 is provided at a rear end of the main body 200 and discharges the frost collected in the main body 200 to the outside. The frost discharging unit 400 may include a second shut-off valve 401 which controls the discharging of the frost. The frost discharging unit 400 is not specifically limited as long as the discharging unit has a space which allows the gas to be inserted and discharged, but desirably has a cylindrical shape having a space and a material therefor has corrosion resistance and impact resistance The first shut-off valve 301 and the second shut-off valve 401 are valves for controlling the gas or frost to be open and closed. That is, in order to remove the water from the pollutants-contained gas and supply the gas from which water is removed to the analyzing device, the first shut-off valve and the second shut-off valve are switched to a gas discharging mode as illustrated in FIG. 11A. In other words, the first shut-off valve 301 is open and the second shut-off valve 401 is closed. In contrast, in order to discharge the frost 220 collected in the main body 200 to the outside, the first shut-off valve and the second shut-off valve are switched to a frost discharging mode as illustrated in FIG. 11B. In other words, the first shut-off valve 301 is closed and the second shut-off valve 401 is open.

Figure 12:
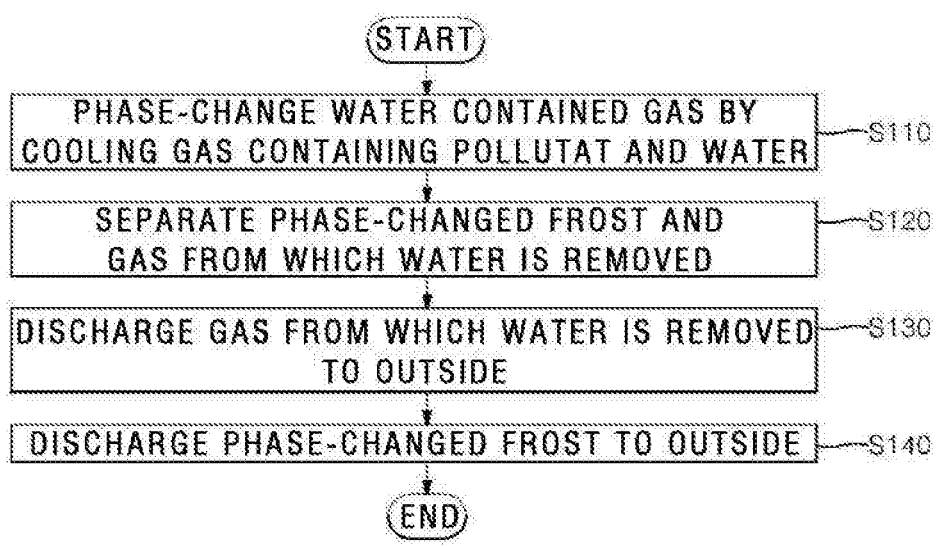
FIG. 12 is a flowchart for explaining a method of removing water contained in a gaseous material of the present invention.

Hereinafter, a method of removing water by phase-changing water contained in a gaseous material to a frost phase of the present invention will be described with reference to FIG. 12. FIG. 12 is a flowchart for explaining a method of removing water contained in a gaseous material of the present invention.

As illustrated in FIG. 12, the method may include a first step S110 of phase-changing water contained in a gas to a frost shape by cooling inflow gas which contains water, a second step S120 of separating the phase-changed frost and the gas from which water is removed, a third step S130 of discharging the gas from which water is removed to the outside, and a fourth step S140 of discharging the phase-changed frost to the outside.

To be more specific, the first step S110 is a step of phase-changing the water contained in the gas to the frost phase as described above by cooling the gas in order to remove the water contained in the gaseous pollutant which serves as an obstacle material at the time of measurement and analysis of the gaseous pollutant. Here, the cooling temperature may be adjusted to be −10° C. or lower, and more desirably −20° C. to −50° C.

In the meantime, the method of the present invention may further include a step of heating the gas containing pollutant to a temperature in a predetermined range before the cooling step and the heating temperature may be adjusted to be 60° C. to 150° C. and more desirably 60° C. to 100° C.

When the gas which is adjusted to an appropriate temperature range is cooled, as described above, the water contained in the gaseous pollutant is phase-changed to a frost phase by the Mpemba effect.

The second step S120 is a step of separating and removing the frost phase-changed in the first step from the gas flow and the third step S130 is a step of guiding the gas from which the water is removed to the outside, to be more specific, to the analyzing device.

The frost which is phase-changed in the first step S110 is precipitated by its own weight and the gas from which water is removed flows into the analyzing device to analyze the type of pollutant and/or a concentration of the pollutant.

In this case, when particulate materials are included in the gaseous pollutant, the particulate materials are trapped by the water during the phase-changing to the frost or impinged on the phase-changed frost to be separated and removed from the gaseous flow.

The fourth step S140 is a step of discharging the frost 220 which is phase-changed and collected, to the outside.

The fourth step S140 is a step of discharging the collected frost 220 to the outside by supplying the compressed air in a pulsed manner so that the frost 220 collected in steps S120 and S130 does not flow into the analyzing device.

Even though specific parts of the present invention have been described in detail above, those skilled in the art will appreciate that the specific description is merely preferred embodiment and the scope of the present invention is not limited thereto. It will be apparent to those skilled in the art that various modifications and changes will be made without departing from the scope of the present invention and the range of the technical spirit and the modifications and changes are intended to fall within the scope of the appended claims.

What is claimed is:

1. An apparatus of removing water by phase-changing water contained in a gaseous material to a frost phase, comprising:
    a gas inflow unit which is equipped with a first cooling unit which phase-changes the water in inflow gas which includes water at one side;
    a main body which collects the frost generated in the gas inflow unit and provides a space for moving the gas from which moisture is removed;
    a discharging unit which discharges the gas from which the moisture is removed and is connected to one side of the main body; and
    a frost discharging unit which communicates with the main body to discharge frost collected in the space.

2. The apparatus according to claim 1, wherein the gas inflow unit further includes a heating unit for adjusting the gas which contains water to 60° C. to 150° C.

3. The apparatus according to claim 1, wherein the first cooling unit adjusts the gas which passes through the heating unit to be −10° C. or lower.

4. The apparatus according to claim 1, wherein the gas inflow unit further includes a pulsed air supply unit which discharges the collected frost to the frost discharging unit.

5. The apparatus according to claim 3, further comprising:
    any one or more shut-off valves of a first shut-off valve equipped in the discharging unit which controls the discharge of the gas from which the water is removed; and
    a second shut-off valve equipped in the frost discharging unit which discharges the collected frost to the outside.

6. The apparatus according to claim 1, further comprising:
    a second cooling unit which cools the main body so as not to dissolve the frost collected in the main body provided at one side of the main body.

7. The apparatus according to claim 1, wherein the first cooling unit includes silica or glass.

8. The apparatus according to claim 1, wherein the main body further includes a collecting unit having a concave shape at a lower portion to collect the phase-changed frost.

9. The apparatus according to claim 1, wherein a tapered portion in which an inner diameter at one side of the first cooling unit connected to the main body is gradually reduced is formed.

10. A method of removing water by phase-changing water contained in a gaseous material to a frost phase, comprising:
    a first step of phase-changing water contained in a gas to a frost phase by cooling inflow gas including water by a first cooling unit;
    a second step of separating the phase-changed frost and the gas from which water is removed in a main body;
    a third step of discharging the gas from which water is removed to the outside through a discharging unit of the main body; and
    a fourth step of discharging the phase-changed frost collected in the collecting unit of the main body to the outside through the frost discharging unit.

11. The method according to claim 10, further comprising:
    before the first step, a step of adjusting the gas which contains water to 60° C. to 150° C. by a heating unit.

12. The method according to claim 10, wherein the cooling temperature in the first step is adjusted to be −10° C. or lower.

13. The method according to claim 10, wherein in the fourth step, the frost collected by pulsed air supply is discharged to the outside.

* * * * *